(12) United States Patent
Szklar

(10) Patent No.: US 10,994,710 B2
(45) Date of Patent: May 4, 2021

(54) SYSTEMS AND METHODS FOR VEHICLE BRAKING CONTROL

(71) Applicant: CATTRON NORTH AMERICA, INC., Warren, OH (US)

(72) Inventor: Oleh Szklar, Saint Hubert (CA)

(73) Assignee: CATTRON NORTH AMERICA, INC., Warren, OH (US)

( * ) Notice: Subject to any disclaimer, the term of this patent is extended or adjusted under 35 U.S.C. 154(b) by 203 days.

(21) Appl. No.: 16/508,557

(22) Filed: Jul. 11, 2019

(65) Prior Publication Data
US 2020/0223405 A1 Jul. 16, 2020

Related U.S. Application Data

(60) Provisional application No. 62/793,252, filed on Jan. 16, 2019, provisional application No. 62/816,622, filed on Mar. 11, 2019.

(51) Int. Cl.
| B60T 7/16 | (2006.01) |
| B60T 13/26 | (2006.01) |
| B60T 13/62 | (2006.01) |
| B61H 13/34 | (2006.01) |

(52) U.S. Cl.
CPC ............. *B60T 7/16* (2013.01); *B60T 13/268* (2013.01); *B60T 13/62* (2013.01); *B61H 13/34* (2013.01); *B60T 2270/402* (2013.01)

(58) Field of Classification Search
CPC .......... B60T 7/16; B60T 8/4081; B60T 13/62; B60T 13/66; B60T 13/268; B60T 13/14; B60T 13/36; B60T 13/665; B60T 13/683; B60T 15/048; B60T 15/16; B60T 15/48; B60T 17/18; B60T 17/228
USPC ................ 303/14, 7, 8, 9, 9.61, 13, 128, 20; 188/33, 107, 352, 15, 16, 29, 30, 39, 85, 188/86
See application file for complete search history.

(56) References Cited

U.S. PATENT DOCUMENTS

| 1,939,866 | A | * | 12/1933 | Fredericks | ............ B60T 13/665 303/3 |
| 7,434,895 | B2 | | 10/2008 | Reynolds | |
| 2007/0236077 | A1 | * | 10/2007 | Schweikert | ........... B60T 8/1893 303/7 |

(Continued)

OTHER PUBLICATIONS

Beltpack Remote Control System, https://www.cattron.com/transportation/beltpack, accessed Jun. 11, 2019, 4 pages.

*Primary Examiner* — Robert A. Siconolfi
*Assistant Examiner* — San M Aung
(74) *Attorney, Agent, or Firm* — Harness, Dickey & Pierce, P.L.C.; Anthony G. Fussner (57) ABSTRACT

A vehicle braking system includes a primary system including at least one pneumatic brake pipe control valve, and a secondary back-up system configured to facilitate vehicle braking without human intervention. The secondary back-up system includes a first air reservoir coupled to supply pressurized air to the at least one pneumatic brake pipe control valve, a second air reservoir, a choke adapted to allow airflow at a specified airflow rate, and a solenoid valve adapted to selectively couple and decouple the first air reservoir and the second air reservoir via the choke, according to an energization state of the solenoid valve.

20 Claims, 4 Drawing Sheets (56) References Cited

U.S. PATENT DOCUMENTS

2009/0057072 A1\* 3/2009 Wood .................... B60T 13/683
 188/34
2010/0295366 A1\* 11/2010 Bradley ................ B60T 8/3235
 303/133

\* cited by examiner

SYSTEMS AND METHODS FOR VEHICLE BRAKING CONTROL

CROSS-REFERENCE TO RELATED APPLICATIONS

This application claims priority to and the benefit of U.S. Provisional Application No. 62/793,252 filed Jan. 16, 2019, and U.S. Provisional Application No. 62/816,622 filed Mar. 11, 2019. The entire disclosures of the above applications are incorporated herein by reference.

FIELD

The present disclosure generally relates to systems and methods for vehicle braking control.

BACKGROUND

This section provides background information related to the present disclosure which is not necessarily prior art.

In some vehicles, such as a remotely controlled locomotive (RCL) for example, there may not be an operator on-board to control a braking system of the vehicle. Without an operator (e.g., a locomotive engineer, etc.) on-board, the RCL system is responsible for proper operation and movement of the locomotive.

If the RCL system detects an operating anomaly or failure, the RCL system should ensure that the locomotive can be brought to a safe stop regardless of the nature of the anomaly or failure. A particularly critical situation is if a braking system fails. In that case, an alternative (e.g., diverse) braking mechanism should be implemented.

Under normal (e.g., non-fault) conditions, an independent brake may be used by a speed controller of the RCL system. In some situations, a remote control operator (RCO) may be required to use the train brake to maintain a speed commanded by the RCL system. However, when an anomaly or failure is detected (e.g. non-normal operation), the RCL system may engage an available safety brake channel, such as a full service train brake (FSTB). When a full service train brake state is declared, a diverse (e.g., backup) braking system may be used in conjunction with or instead of the primary train brake control.

DRAWINGS

The drawings described herein are for illustrative purposes only of selected embodiments and not all possible implementations, and are not intended to limit the scope of the present disclosure.

FIG. 4 also illustrates a delta pressure (change in psi per 100 milliseconds) versus time for the first air reservoir.

Corresponding reference numerals indicate corresponding parts (although not necessarily identical) parts throughout the several views of the drawings

DETAILED DESCRIPTION

Example embodiments will now be described more fully with reference to the accompanying drawings.

A locomotive full service train brake (FSTB) application may include a gradual pressure reduction in a pneumatic brake pipe (BP), which may run along all or a portion of the length of the train. A primary train brake control may use a proportional control valve, where a computer commands a specific pressure setting and the proportional control valve converts an electrical command signal into a pneumatic pressure. The approach may require continuous communication between the computer and the proportional control valve.

A diverse, failsafe FSTB design may be activated by a binary signal (e.g., on or off, etc.). When the FSTB signal is on, the FSTB solenoid may be activated so no brake is applied. When the FSTB signal is off, the diverse backup brake may be activated to apply braking. This failsafe control scheme is selected so the FSTB will default to the brake applied state if electrical power is lost, a control wire breaks, etc.

The FSTB solenoid and associated FSTB pneumatic components may achieve a required brake pipe control pressure reduction without further input from a computer. The FSTB components may control the pressure of a functional equivalent to a locomotive equalizing reservoir (ER), which may represent a target brake pipe pressure. For example, the brake pipe pressure reduction may be accomplished by pressure equalization between multiple air reservoirs. When one air reservoir volume is pressurized and then is pneumatically connected to an empty (e.g., atmospheric pressure) air reservoir volume, the pressurized air is shared between the two air reservoirs, resulting in a lower pressure than the original pressure of the pressurized air reservoir.

The relative volumes of the two air reservoirs will determine the final (e.g., equalized, etc.) pressure, and the line restriction interconnecting the two air reservoirs will determine the rate at which pressure is reduced in the pressurized air reservoir (e.g., the rate at which the pressure is equalized, etc.). An appropriate brake pipe pressure reduction and rate can be achieved by selecting appropriate relative volumes of the air reservoirs and an appropriate restriction diameter of the choke connected between the two air reservoirs.

Some braking systems vent the original pressurized volume of the first air reservoir to atmosphere via an adjustable choke (e.g., restriction, etc.). When the brake pipe pressure has reached a target full service train brake pressure setting, an auxiliary pressure regulator will continue to feed the brake pipe control line in order to compensate for the air (e.g. pressure, etc.) lost by the open venting orifice.

For example, once a pressure in the air reservoir drops from 90 pounds per square inch (psi) to 55 psi, a pressure regulator supply turns on to compensate for the continuous venting of the air reservoir to atmosphere, in order to maintain the brake pipe pressure at 55 psi. This may result in a continuously present audible air leakage through an adjustable choke when the brake is applied.

The audible air leak is often misinterpreted by technicians as a failure, and corrective action is sometimes taken to eliminate the leak, thereby inhibiting the functionality of the backup breaking feature. Also, the adjustable choke is sometimes adjusted improperly, leading to erroneous operation of the braking system.

Some example embodiments described herein may protect against a failure of a primary train brake control (e.g., components, interfaces, etc.), by providing a diverse braking system to ensure an appropriate full service train brake is applied to achieve a railroad penalty brake retarding force on the locomotive, and possibly to cars if connected to the locomotive.

While non-RCL railroad penalty brakes drop the brake pipe pressure to atmospheric pressure, some example embodiments described herein drop the brake pipe pressure down to a level that will result in a full service brake retarding force, without reducing the brake pipe pressure to atmospheric pressure.

For example, instead of venting a brake pipe pilot pressure to atmosphere, the braking system may equalize pressure between an initially pressurized air reservoir and a second reservoir sealed at atmospheric pressure. This may provide a required pressure drop (e.g., from about 90 psi to about 55 psi, etc.), without continuously venting air to atmosphere, thereby eliminating the audible leak.

This approach may save a significant amount of compressed air within connected car auxiliary reservoirs, thereby resulting in faster brake recovery times and significant operating time savings after a full service train brake application. Also, the adjustable choke may be replaced by a fixed choke to inhibit human error due to maladjustment of an adjustable choke, etc.

Example embodiments may use fewer components than existing braking systems, thereby increasing reliability, increasing ease of installation, reducing system size, reducing system cost, etc. Example embodiments may be less susceptible to unauthorized maladjustment of related components to reduce the potential for function anomalies, may require less maintenance and calibration, may incorporate self-checking features so an RCL system can identify an anomaly or failure as the anomaly or failure occurs (or shortly thereafter), etc.

Disclosed herein are exemplary embodiments of systems and methods for vehicle braking control. In one example embodiment, a vehicle braking system includes a primary system including at least one pneumatic brake pipe control valve, and a secondary back-up system configured to facilitate vehicle braking (e.g., without human intervention, in the presence of a failure of the primary brake pipe control valve, etc.). The secondary back-up system includes a first air reservoir coupled to supply pressurized air to the at least one pneumatic brake pipe control valve, a second air reservoir, and a choke (e.g., adjustable, fixed, etc.) adapted to allow airflow through the choke at a specified airflow rate. The system also includes a solenoid valve adapted to selectively couple and decouple the first air reservoir and the second air reservoir via the choke, according to an energization state of the solenoid valve.

For example, when the solenoid valve is in an energized state, the first air reservoir may be coupled to an air supply to maintain an air pressure in the reservoir at a specified pressure value (e.g., at least 90 psi, at least 95 psi, etc.), and the second air reservoir may be vented to atmosphere to maintain the second air reservoir at atmospheric pressure (e.g., about zero psi, etc.).

When the solenoid is in a deenergized state, the first air reservoir may be uncoupled from the air supply and coupled to the second air reservoir via the choke to equalize the air pressure in the first air reservoir and the second air reservoir over a specified period of time (e.g., about 4 seconds, about 12 seconds, about 15 seconds, about 20 seconds, about 25 seconds, etc.), according to the specified air flow rate of the choke and sizes of the first air reservoir and the second air reservoir.

For example, the equalized pressure in the first air reservoir and the second air reservoir may be about 50 psi, about 55 psi, about 60 psi, etc. A size of the first air reservoir may be about 0.5 liters, and a size of the second air reservoir may be about 0.4 liters, etc.

In some embodiments, the at least one pneumatic brake pipe includes a pneumatic brake pipe control valve for a locomotive or a train car. When the solenoid valve is in a deenergized state, the first air reservoir is coupled to the second air reservoir to limit the supply pressure available to the pneumatic brake pipe control valve in order to apply a full service train brake application.

Example systems may include a remote control locomotive (RCL) controller, with the RCL controller configured to deenergize the solenoid valve to apply the full service train brake in response to a failure detection. The RCL controller may be configured to determine a pressure equalization failure when a detected pressure in the first air reservoir and the second air reservoir is greater than or less than a specified equalization pressure value.

In some embodiments, the first air reservoir and the second air reservoir are not vented to atmosphere when the solenoid valve is in a deenergized state. Additionally, or alternatively, the first air reservoir and the second air reservoir may not be coupled with an adjustable pressure regulator.

Figure 1:
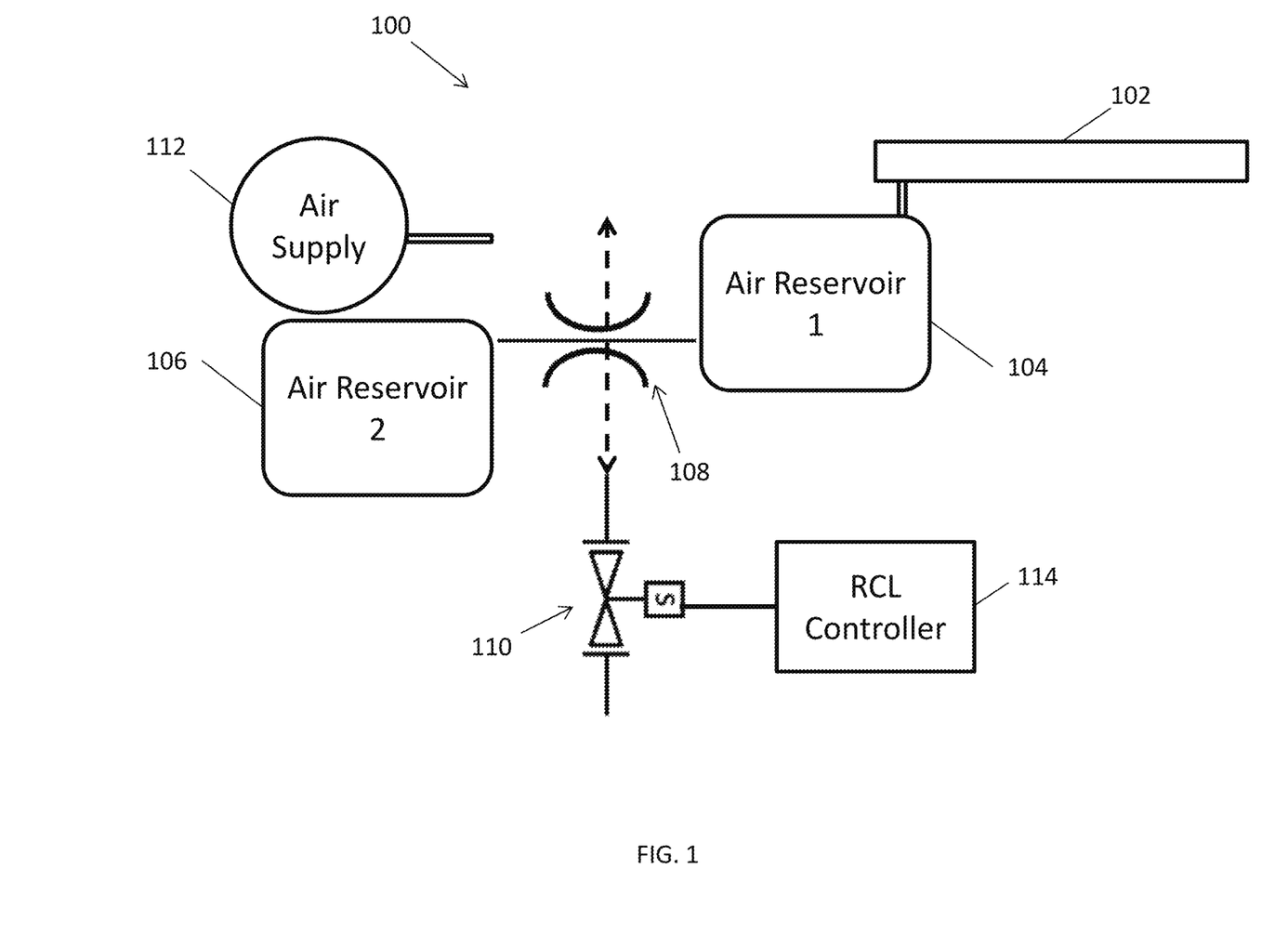
FIG. 1 is a block diagram of a vehicle braking system according to one example embodiment of the present disclosure.

With reference to the figures, FIG. 1 illustrates an example vehicle braking system 100 according to some aspects of the present disclosure. The system 100 includes a primary system including at least one pneumatic brake pipe control valve 102, and a secondary back-up system configured to facilitate vehicle braking. The secondary back-up system includes a first air reservoir 104 coupled to supply pressurized air to the at least one pneumatic brake pipe control valve 102.

The secondary back-up system 100 also includes a second air reservoir 106, a choke 108 adapted to allow airflow through the choke 108 at a specified airflow rate, and a solenoid valve 110. The solenoid valve 110 is adapted to selectively couple and decouple the first air reservoir 104 and the second air reservoir 106 via the choke 108, according to an energization state of the solenoid valve 110.

The system 100 may be considered as a redundant (e.g., diverse, etc.) system, which may be used with an unmanned remote control locomotive (RCL). The secondary back-up system may facilitate vehicle braking without human intervention, and may facilitate vehicle braking in the presence of a failure of the pneumatic brake pipe control valve 102. For example, even if the primary control valve fails to a 90 psi setting, etc., the first and second air reservoirs 104 and 106 may still cause the train brakes to fully apply.

As described further below, when the solenoid valve 110 is in an energized state, the first air reservoir 104 may be coupled to an air supply 112 to maintain an air pressure in the first air reservoir 104 at a specified pressure value (e.g., about 90 psi, about 95 psi, etc.). At the same time, the second air reservoir 106 may be vented to atmosphere to maintain the second air reservoir 106 at atmospheric pressure (e.g., about zero relative psi, etc.). Therefore, when the solenoid valve 110 is energized, the first air reservoir 104 is pressurized while the second air reservoir 106 is maintained at about atmospheric pressure.

When the solenoid valve 110 is in a deenergized state (e.g., due to a failure event, in response to a full service train brake signal, etc.), the first air reservoir 104 may be coupled to the second air reservoir 106 via the choke 108 to equalize the air pressure in the first air reservoir 104 and the second air reservoir 106 over a specified period of time, according to the specified air flow rate of the choke 108 and sizes of the first air reservoir 104 and the second air reservoir 106.

For example, if relative sizes of the first air reservoir 104 and the second air reservoir 106 are known, and the air flow rate of the choke 108 is known (e.g., based on an orifice diameter size of a fixed choke, a setting of an adjustable choke, etc.), the specified period of time for the air pressure to equalize between the first air reservoir 104 and the second air reservoir 106 can be determined. In some cases, the specified period of time may be in a range of about 4 to 25 seconds (e.g., plus or minus three seconds, five seconds, etc.). This time period may be determined in order to meet a desired time frame for reaching a target reduction in demanded brake pipe air pressure to implement a full service train brake application, etc.

The FSTB components may control a captive volume pressure equivalent to a locomotive equalizing reservoir. The captive volume may be fixed (e.g., constant, etc.) regardless of a number of cars coupled to a locomotive. The volume of the brake pipe may depend on the number of cars coupled to the locomotive, so the timing for equalizing pressure volumes of the first air reservoir 104 and the second air reservoir 106 may apply to a captive volume.

Additionally, the equalized pressure in the first air reservoir 104 and the second air reservoir 106 can be determined based on their relative sizes. As an example, if the first air reservoir 104 is pressurized to about 95 psi (e.g., plus or minus one psi, plus or minus three psi, plus or minus five psi, etc.), a size of the first air reservoir 104 is about 0.5 liters and a size of the second air reservoir 106 is about 0.4 liters (e.g., plus or minus 0.1 liters, etc.), a specified equalization pressure between the first air reservoir 104 and the second air reservoir 106 may be about 55 psi.

Each air reservoir 104 and 106 may include any suitable container, chamber, etc. for holding a pressurized volume of air. Example pressure values, reservoir sizes, time values, etc. described herein are for illustrative purposes only, and any suitable values may be used without departing from the scope of the present disclosure. As should be apparent, specified target values may be used with tolerances (e.g., within about 1%, within about 5%, within about 10%, etc.), without departing from the scope of the present disclosure.

In some embodiments, the pneumatic brake pipe control valve 102 may be a pneumatic brake pipe control valve for a locomotive or a train car. When the solenoid valve 110 is in a deenergized state, the first air reservoir 104 may be coupled to the second air reservoir 106 to apply a full service train brake.

The system 100 may include a remote control locomotive (RCL) controller 114, with the RCL controller 114 configured to deenergize the solenoid valve 110 to apply the full service train brake in response to a failure detection. The RCL controller 114 may be configured to determine a pressure equalization failure when a detected pressure in the first air reservoir 104 and the second air reservoir 106 is greater than or less than a specified equalization pressure value (e.g., about 55 psi, etc.).

For example, if the detected equalization pressure is greater than the specified equalization pressure value, the RCL controller 114 may determine an air supply pressure setting failure. If the detected equalization pressure is less than the specified equalization pressure value, the RCL controller 114 may determine that a leak has occurred. In any event, the RCL controller 114 may transmit an alert signal, generate an audio and/or visual alarm, etc.

As described above, the solenoid valve 110 is in an energized state during normal operating conditions, and enters a deenergized state when a failure occurs, when a full service train brake signal is received, etc. This provides a failsafe to apply the full service train brake in the event of a loss of system power, a control signal error, etc.

In some embodiments, the solenoid valve 110 may couple the first air reservoir 104 to the air supply 112 when energized, and couple the first air reservoir 104 to the second air reservoir 106 when a failure occurs, when a full service train brake signal is received, etc.

Because the first air reservoir 104 and the second air reservoir 106 are coupled to one another to reach an equalization pressure when the solenoid valve 110 is deenergized via a failure condition, a full service train brake signal, etc., the first air reservoir 104 and the second air reservoir 106 may not be vented to atmosphere while coupled to one another (e.g., while the solenoid valve 110 is deenergized, etc.).

By not venting the first air reservoir 104 and the second air reservoir 106 to atmosphere during a full service train brake application, the system 100 may avoid an audible air leak that could be misinterpreted as a system error by a technician, the system 100 may reduce the need to continuously supply air to maintain the equalization pressure, etc.

The choke 108 may be a fixed (e.g., constant, etc.) choke 108 for coupling the first air reservoir 104 and the second air reservoir 106 to reach the equalization pressure in a specified time period, the system 100 may avoid erroneous adjustments to an adjustable pressure regulator, provide a more reliable and accurate time period for equalizing the pressure between the first air reservoir 104 and the second air reservoir 106, etc. In other embodiments, the choke 108 may be adjustable (e.g., having adjustable airflow rates, etc.).

The air supply 112 may be fixed (e.g., regulated, etc.), which may avoid erroneous adjustments of an adjustable pressure regulator, may avoid an incorrect final equalizing pressure between the first air reservoir 104 and the second air reservoir 106, etc.

Some example embodiments may provide an advantage of a consistent brake pipe reduction rate regardless of a volume of air in the brake pipe. For example, the system 100 may provide a failsafe device that can be added to the pilot pressure of an analog/proportional valve that controls pressure under normal operating conditions.

When the first air reservoir 104 and the second air reservoir 106 are coupled to define a captive volume and set to a limited pressure, a failure of the proportional valve may not cause an output to go to a higher pressure than the FSTB pressure. For example, the system 100 may provide the ability to override an erroneously high output pressure of the proportional control valve. Reducing the brake pipe pressure may increase braking effort for the locomotive.

Figure 2:
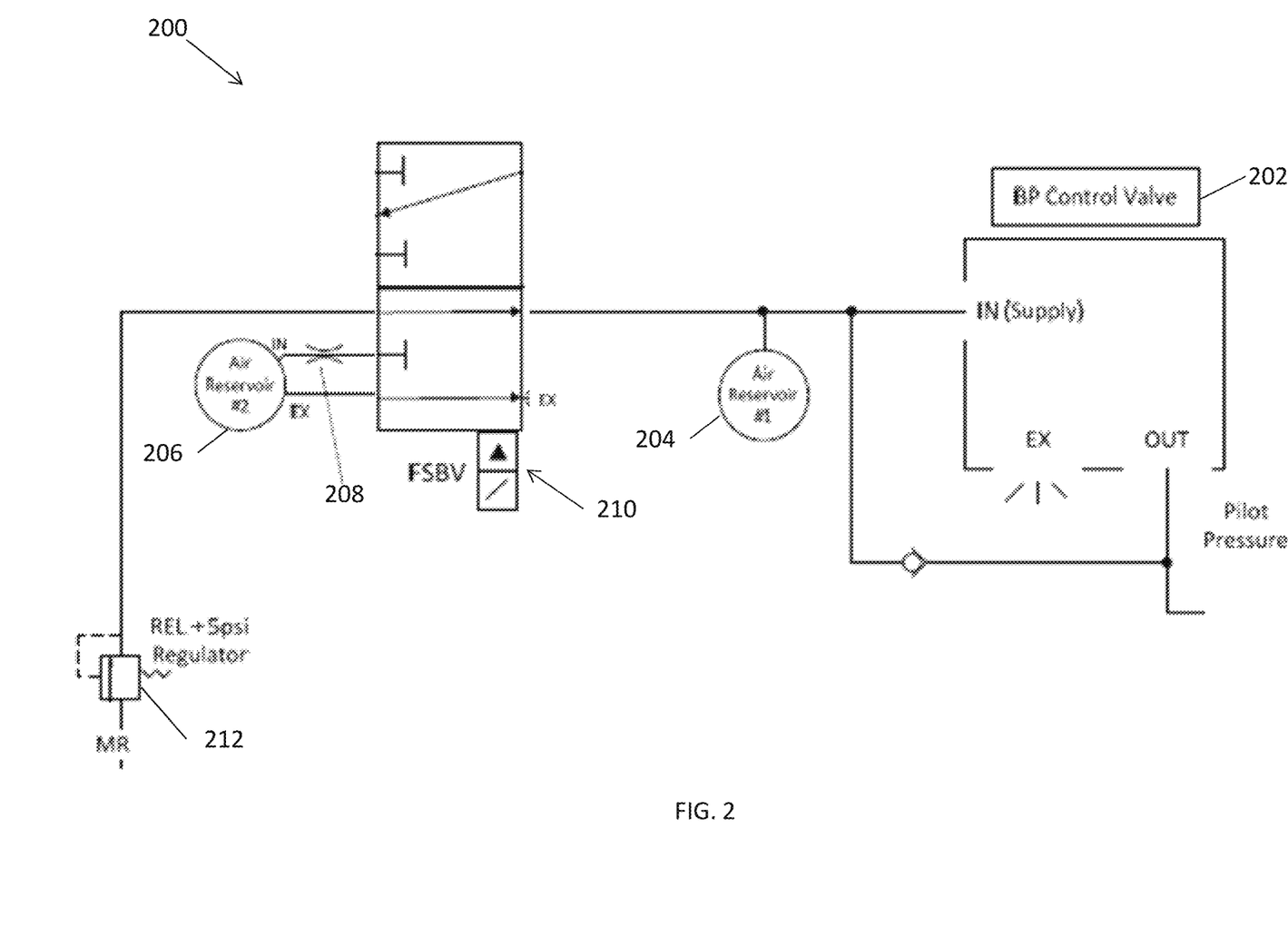
FIG. 2 is a schematic of a vehicle braking system, according to another example embodiment of the present disclosure.

FIG. 2 illustrates an example vehicle braking system 200 according to another example embodiment of the present disclosure. The system 200 includes at least one pneumatic brake pipe control valve 202, and a first air reservoir 204 coupled to supply pressurized air to the at least one pneumatic brake pipe control valve 202.

The system 200 also includes a second air reservoir 206, a choke 208 adapted to allow airflow through the choke 208 at a specified airflow rate, and a solenoid valve 210. The solenoid valve 210 is adapted to selectively couple and decouple the first air reservoir 204 and the second air reservoir 206 via the choke 208, according to an energization state of the solenoid valve 210.

FIG. 2 illustrates the solenoid valve 210 in an energized state, where the first air reservoir 204 is coupled to a regulated air supply 212 to maintain an air pressure in the first air reservoir 204 at a specified pressure value (e.g., about 90 psi, about 95 psi, etc.). For example, the air supply 212 may be fed directly into an input of the brake pipe control valve 202 (e.g., supply port, etc.) of the pneumatic brake pipe control valve 202, with the air supply at 95 pounds per square inch (psi) to facilitated a pressure of 90 psi, etc. in the pneumatic brake pipe control valve 202. The air supply 212 may also feed and maintain the first air reservoir 204 at about 95 psi, etc.

At the same time, the second air reservoir 206 is vented to atmosphere to maintain the second air reservoir 206 at atmospheric pressure (e.g., about zero psi gauge, etc.). Therefore, when the solenoid valve 210 is energized, the first air reservoir 204 is pressurized while the second air reservoir 206 is maintained at about atmospheric pressure.

When a locomotive control unit (LCU) or remote control locomotive (RCL) controller detects a failure condition, receives a full service train brake signal, etc., the brake pipe control valve 202 may be commanded to gradually reduce the brake pipe pressure (e.g., by about one to two psi per second, etc.). In some embodiments, the pressure may be reduced by about 30 psi (e.g., from 90 psi down to 60 psi, etc.). It should be apparent that the present disclosure is not limited to RCL controllers, and other embodiments may not include an RCL controller, etc.

Figure 3:
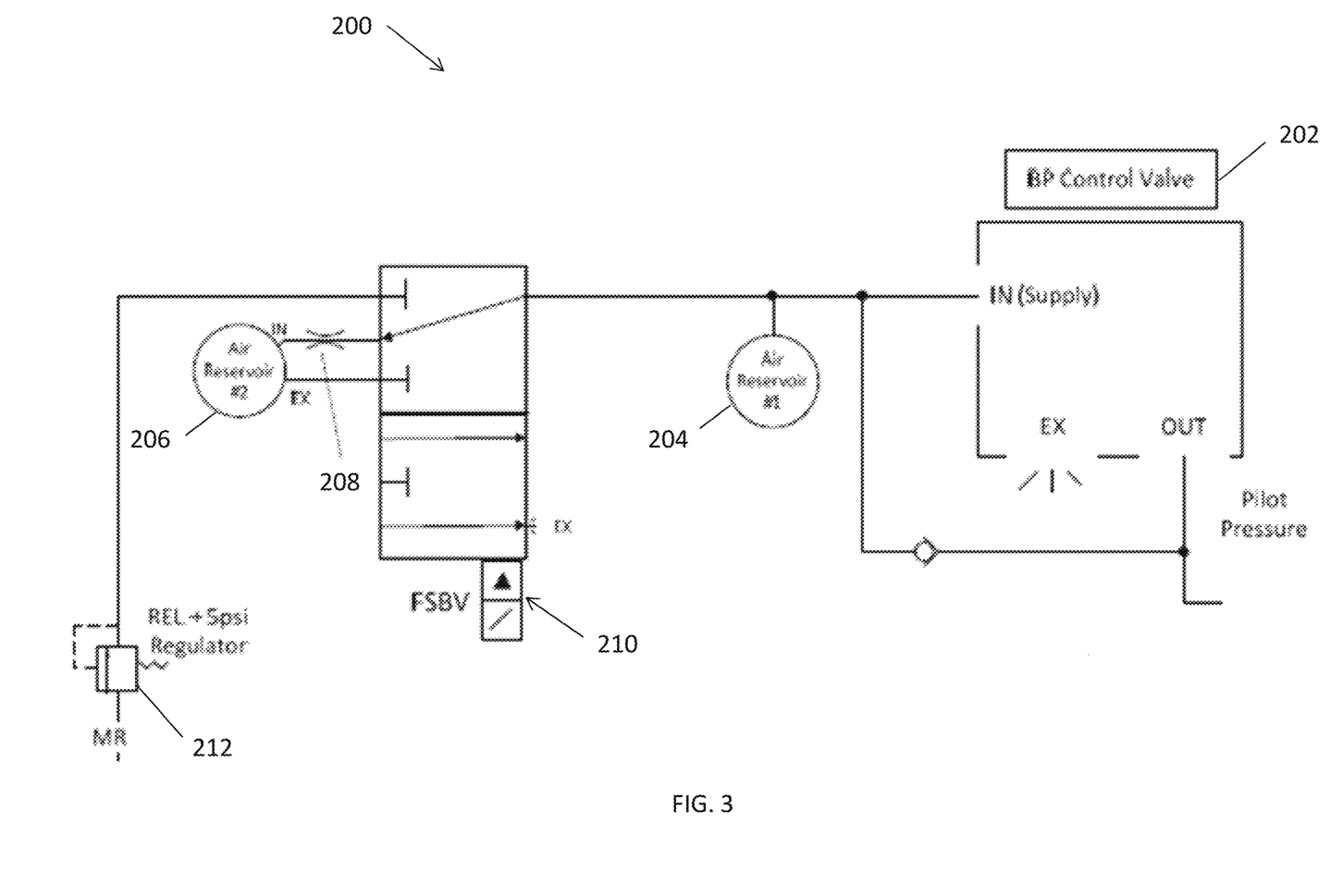
FIG. 3 is a schematic of the vehicle braking system shown in FIG. 2, when the solenoid valve is in a deenergized state.

When the locomotive control unit (LCU) or remote control locomotive (RCL) controller detects a failure condition, a binary output safety channel signal to the solenoid valve 210 may be set to zero, turned off, etc., to deenergize the solenoid valve 210. FIG. 3 illustrates the system 200 with the solenoid valve 210 in the deenergized state.

As shown in FIG. 3, deenergizing the solenoid valve 210 moves the schematic block down, so the air supply 212 is disconnected from the first air reservoir 204 and the pneumatic brake pipe control valve 202. Instead, the first air reservoir 204 is coupled to the second air reservoir 206 via the choke 208. The second air reservoir 206 is no longer vented to atmosphere.

As described above, coupling the first air reservoir 204 and the second air reservoir 206 equalizes pressure in the first air reservoir 204 and the second air reservoir 206 over a specified time period. The pressure equalization is gradual due to the choke 208. A diameter of an orifice of a fixed choke 208 is preferably selected, or a setting of an adjustable choke 208 is selected, so the specified time period is about 4 seconds, about 12 seconds, about 15 seconds, about 20 seconds, about 25 seconds, etc.

The equalization pressure may be determined based on relative sizes of the first air reservoir 204 and the second air reservoir 206. For example, the equalization pressure may be equal to an initial pressure of the first air reservoir 204 times the volume of the first air reservoir 204, divided by a summed volume of the first and second air reservoirs 204 and 206.

After the LCU, RCL controller, etc. reduces the brake pipe pressure in response to a failure condition, a full service train brake signal, etc., the pressure may be continuously monitored to determine proper operation of the full service train brake application. For example, if a reduced pressure setting of 60 psi is commanded by the proportional valve, the LCU, RCL controller, etc. may expect to eventually measure a 55 psi pressure due to the FSTB output pressure limiting the maximum pressure that the proportional valve can command (e.g., the equalization pressure of the first air reservoir 204 and the second air reservoir 206, etc.).

If the LCU, RCL controller, etc. detects that the pressure has dropped by at least five psi more than the commanded pressure reduction (e.g., down to 55 psi for a commanded 60 psi setting, etc.), it may be determined that the full service train brake application is working properly.

If the pressure does not reduce beyond the commanded setting (e.g., does not reduce below 60 psi, etc.), it may be determined that the first air reservoir 204 and the second air reservoir 206 have not equalized properly (e.g., the vehicle braking system 200 is not operating properly, etc.). This may be recorded (e.g., by the RCL controller, etc.) as a full service train brake valve reduction failure, etc., and may indicate a failure of the solenoid valve 210.

If the detected pressure drops lower than the specified equalization pressure (e.g., lower than 55 psi, etc.), it may be determined that there is a leak in the vehicle braking system 200 (e.g., a leak in the solenoid valve 210, a leak in a line connected to the second air reservoir 206, etc.). This may be recorded as a full service train brake valve over-reduction failure.

Figure 4:
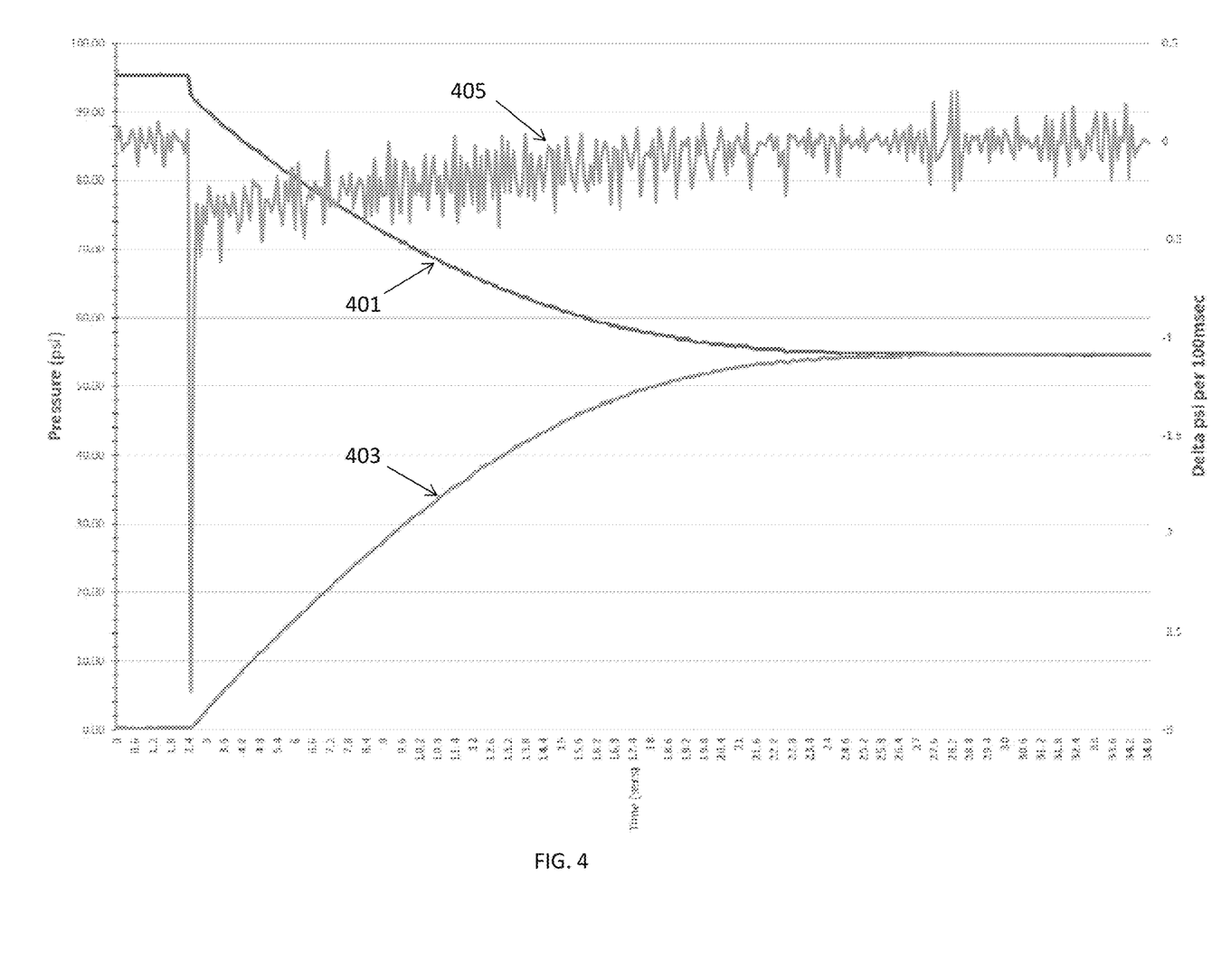
FIG. 4 is a graph illustrating air pressures (psi) over time (seconds) for the first and second air reservoirs of the vehicle braking system shown in FIG. 3.

FIG. 4 illustrates experimental results of pressures (psi) in the first air reservoir 204 and the second air reservoir 206 over time (seconds), after the first air reservoir 204 and the second air reservoir 206 are coupled to one another via the choke 208.

As shown in FIG. 4, a pressure 401 of the first air reservoir 204 is about 95 psi at time zero, and a pressure 403 of the second air reservoir 206 is about zero psi at time zero. The first air reservoir 204 and the second air reservoir 206 are coupled to one another via the choke 208 at approximately 2.4 seconds, with the pressure 401 of the first air reservoir 204 subsequently decreasing and the pressure 403 of the second air reservoir 206 subsequently increasing as pressures in the two air reservoirs 204 and 206 equalize.

A delta pressure 405 is also shown, illustrating the change in psi per 100 milliseconds for the first air reservoir 204. As shown in FIG. 4, there is initially a large change in pressure in the first air reservoir 204 immediately after the first air reservoir 204 is coupled to the second air reservoir 206, and the change in pressure decreases to approximately zero as the pressures in the first air reservoir 204 is coupled to the second air reservoir 206 reach an equalization state.

The equalization pressure of the first air reservoir 204 and the second air reservoir 206 is approximately 55 psi. As shown in FIG. 4, the first air reservoir 204 and the second air reservoir 206 reach 55 psi about 25 seconds after the first air reservoir 204 and the second air reservoir 206 are coupled to one another via the choke 208. As described above, the time period to reach the specified equalization pressure could be increased or decreased by selecting different diameters for the choke 208.

In some embodiments, a size of a pilot line connected to the first air reservoir 204, the second air reservoir 206, etc. may affect the time to reach equalization pressure, the final specified equalization pressure value, etc. For example, a 2 foot section of 0.25 inch (0.17 inch inner diameter) pilot line may not have a significant effect on the equalization pressure value or time, while a 25 foot section of pilot line may increase the time to reach the equalization pressure and result in a lower equalization pressure. This may occur when the length of the pilot line contributes a significant volume of air relative to the size of the first air reservoir 204, the second air reservoir 206, etc., because the pilot line may also be included in the combined equalization volume.

As described herein, the example solenoid valves, RCL controllers, etc. may include and/or be controlled by a microprocessor, microcontroller, integrated circuit, digital signal processor, etc., which may include memory. The solenoid valves, RCL controllers, etc. may be configured to perform (e.g., operable to perform, etc.) any of the example processes described herein using any suitable hardware and/or software implementation. For example, the solenoid valves, RCL controllers, etc. may execute computer-executable instructions stored in a memory, may include one or more logic gates, control circuitry, etc.

According to another example embodiment, a vehicle braking system includes a primary system including at least one pneumatic brake pipe control valve configured to control a brake pipe of a locomotive or train car, and a secondary back-up system including a first air reservoir coupled to supply pressurized air to the at least one pneumatic brake pipe control valve, a second air reservoir, and a choke adapted to allow airflow through the choke at a specified airflow rate.

The vehicle braking system also includes a solenoid valve adapted to couple the first air reservoir to the second air reservoir via the choke in response to a full service train brake signal, to reduce air pressure in the first air reservoir and air pressure available to the brake pipe control valve, by equalizing air pressure between the first air reservoir and the second air reservoir.

In some embodiments, prior to coupling the first air reservoir and the second air reservoir, the first air reservoir is coupled to an air supply to maintain the air pressure in the first air reservoir at a specified air pressure value, and the second air reservoir is vented to atmosphere to maintain the air pressure in the second air reservoir at atmospheric pressure. The first air reservoir and the second air reservoir may not be vented to atmosphere when the first air reservoir is coupled to the second air reservoir via the choke.

According to another example embodiment, an exemplary method of controlling a vehicle braking system is disclosed. The vehicle braking system includes a primary system including at least one pneumatic brake pipe control valve, and a secondary back-up system including a first air reservoir coupled to the at least one pneumatic brake pipe control valve, a second air reservoir, a choke and a solenoid valve.

The exemplary method generally includes supplying pressurized air to the at least one pneumatic brake pipe control valve by the first air reservoir, and coupling the first air reservoir to the second air reservoir via the choke by changing an energization state of the solenoid valve. The method also includes equalizing air pressure between the first air reservoir and the second air reservoir by allowing airflow through the choke at a specified airflow rate.

In some embodiments, the method includes supplying pressurized air to the first air reservoir to maintain an air pressure in the reservoir at a specified pressure value and supplying the brake pipe control valve when the first air reservoir and the second air reservoir are not coupled to one another via the choke. The method may include venting the second air to atmosphere to maintain the second air reservoir at atmospheric pressure when the first air reservoir and the second air reservoir are not coupled to one another via the choke.

Equalizing the air pressure may include equalizing the air pressure between the first air reservoir and the second air reservoir over a specified period of time according to the specified air flow rate of the choke and sizes of the first air reservoir and the second air reservoir. In some embodiments, the method includes determining a pressure equalization failure when a detected pressure in the first air reservoir and the second air reservoir is greater than or less than a specified equalization pressure value.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle braking system comprising:
   a primary system including at least one pneumatic brake pipe control valve; and
   a secondary back-up system configured to facilitate vehicle braking without human intervention, the secondary back-up system including:
      a first air reservoir coupled to supply pressurized air to the at least one pneumatic brake pipe control valve;
      a second air reservoir;
      a choke adapted to allow airflow at a specified airflow rate; and
      a solenoid valve adapted to selectively couple and decouple the first air reservoir and the second air reservoir via the choke, according to an energization state of the solenoid valve.

2. The system of claim 1, wherein the secondary back-up system is configured to facilitate a full train brake in the presence of a failure of the at least one pneumatic brake pipe control valve.

3. The system of claim 1, wherein when the solenoid valve is in an energized state, the first air reservoir is coupled to an air supply to maintain an air pressure in the first air reservoir at a specified pressure value.

4. The system of claim 3, wherein the specified pressure value is at least 95 pounds per square inch.

5. The system of claim 1, wherein when the solenoid is in an energized state, the second air reservoir is vented to atmosphere to maintain the second air reservoir at atmospheric pressure.

6. The system of claim 1, wherein when the solenoid valve is in a deenergized state, the first air reservoir is coupled to the second air reservoir via the choke to equalize the air pressure in the first air reservoir and the second air reservoir over a specified period of time, according to the specified air flow rate of the choke and sizes of the first air reservoir and the second air reservoir.

7. The system of claim 6, wherein the specified period of time is in a range between 4 to 25 seconds.

8. The system of claim 6, wherein the equalized air pressure in the first air reservoir and the second air reservoir is at least 55 pounds per square inch.

9. The system of claim 6, wherein:
   the size of the first air reservoir is 0.5 liters; and
   the size of the second air reservoir is 0.4 liters.

10. The system of claim 6, wherein the choke comprises a fixed choked where the specified airflow rate is non-adjustable.

11. The system of claim 1, wherein:
    the at least one pneumatic brake pipe control valve is configured to control a pneumatic brake pipe of a locomotive or a train car; and
    when the solenoid valve is actuated, the first air reservoir is coupled to the second air reservoir to limit a supply pressure available to the pneumatic brake pipe control valve in order to apply a full service train brake application.

12. The system of claim 11, further comprising a remote control locomotive (RCL) controller, the RCL controller configured to actuate the solenoid valve to apply the full service train brake application.

13. The system of claim 12, wherein the RCL controller is configured to actuate the solenoid valve by deenergizing the solenoid valve in response to a failure detection.

14. The system of claim 13, wherein the RCL controller is configured to determine a pressure equalization failure when a detected pressure in the first air reservoir and the second air reservoir is greater than or less than a specified equalization pressure value.

15. The system of claim 1, wherein the first air reservoir is not vented to atmosphere when the solenoid valve is in a deenergized state and is not vented to atmosphere when the solenoid valve is in an energized state.

16. A method of controlling a vehicle braking system, the vehicle braking system including a primary system including at least one pneumatic brake pipe control valve, and a secondary system back-up system configured to facilitate vehicle braking, the secondary back-up system including a first air reservoir coupled to the at least one pneumatic brake pipe control valve, a second air reservoir, a choke, and a solenoid valve, the method comprising:
   supplying, by the first air reservoir, pressurized air to the at least one pneumatic brake pipe control valve;

coupling the first air reservoir to the second air reservoir via the choke by changing an energization state of the solenoid valve; and equalizing air pressure between the first air reservoir and the second air reservoir by allowing airflow through the choke at a specified airflow rate.

17. The method of claim 16, further comprising supplying pressurized air to the first air reservoir to maintain an air pressure in the first air reservoir to supply the at least one pneumatic brake pipe control valve at a specified pressure value when the first air reservoir and the second air reservoir are not coupled to one another via the choke.

18. The method of claim 16, further comprising venting the second air reservoir to atmosphere to maintain the second air reservoir at atmospheric pressure when the first air reservoir and the second air reservoir are not coupled to one another via the choke.

19. A vehicle braking system, comprising:
a primary system including at least one pneumatic brake pipe control valve configured to control a brake pipe of a locomotive or train car; and
a secondary back-up system configured to facilitate vehicle braking, the secondary back-up system comprising:
a first air reservoir coupled to supply pressurized air to the at least one pneumatic brake pipe control valve;
a second air reservoir;
a choke adapted to allow airflow through the choke at a specified airflow rate; and
a solenoid valve adapted to couple the first air reservoir to the second air reservoir via the choke in response to a full service train brake signal, to reduce air pressure in the first air reservoir and air pressure available to the at least one pneumatic brake pipe control valve, by equalizing air pressure between the first air reservoir and the second air reservoir.

20. The system of claim 19, wherein the secondary back-up system is configured to facilitate a full train brake in the presence of a failure of the at least one pneumatic brake pipe control valve.

* * * * *